(12) United States Patent
Liu et al.

(10) Patent No.: US 12,483,501 B1
(45) Date of Patent: Nov. 25, 2025

(54) MPLS MESSAGE ENCAPSULATION METHOD AND APPARATUS, AND STORAGE MEDIUM AND ELECTRONIC APPARATUS

(71) Applicant: ZTE Corporation, Shenzhen (CN)

(72) Inventors: Yao Liu, Shenzhen (CN); Shaofu Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 160 days.

(21) Appl. No.: 18/685,946

(22) PCT Filed: Jul. 15, 2022

(86) PCT No.: PCT/CN2022/106042
§ 371 (c)(1),
(2) Date: Feb. 23, 2024

(87) PCT Pub. No.: WO2023/024755
PCT Pub. Date: Mar. 2, 2023

(30) Foreign Application Priority Data

Aug. 23, 2021 (CN) .......................... 202110971061.2

(51) Int. Cl.
*H04L 45/50* (2022.01)
*H04L 45/00* (2022.01)
*H04L 45/302* (2022.01)

(52) U.S. Cl.
CPC ............ *H04L 45/50* (2013.01); *H04L 45/306* (2013.01); *H04L 45/566* (2013.01)

(58) Field of Classification Search
CPC ...... H04L 45/50; H04L 45/306; H04L 45/566
(Continued)

(56) References Cited

U.S. PATENT DOCUMENTS 7,227,867 B1 * 6/2007 Ferguson ................ H04L 45/10
370/395.5
2010/0040061 A1 2/2010 Mcguire et al.
(Continued)

FOREIGN PATENT DOCUMENTS

CN          108111416 A     6/2018
CN          108737269 A     11/2018

OTHER PUBLICATIONS

Bryant A Clemm, "Use of an MPLS LSE as an Ancillary Data Pointer" May 18, 2021, pp. 1-14, XP015145857.
(Continued)

*Primary Examiner* — Anthony Mejia
(74) *Attorney, Agent, or Firm* — CANTOR COLBURN LLP

(57) ABSTRACT

Provided in the embodiments of the present disclosure is an MPLS message encapsulation method. The method comprises: setting an MPLS manage header in a stack bottom structure of an MPLS label stack, where the MPLS manage header is located after a stack bottom label and prior to ancillary data; the MPLS manage header includes: a data type and offset length information of the ancillary data; and the stack bottom structure includes: the MPLS manage header and the ancillary data. By means of the technical solution, the problems in the related art of high complexity, low efficiency, etc. of an indication mode of an MPLS label stack are solved.

20 Claims, 7 Drawing Sheets

(58) Field of Classification Search
USPC .......................................................... 709/238
See application file for complete search history.

(56) References Cited

U.S. PATENT DOCUMENTS

2020/0322266 A1* 10/2020 Clad .................... G06F 21/57
2020/0358698 A1   11/2020 Song et al.
2021/0119914 A1    4/2021 Busi et al.

OTHER PUBLICATIONS

European Search Report for corresponding application EP22860101; Report dated Jun. 6, 2024.
Song H, "Optional for MPLS Extension Header Indicator", Mar. 10, 2021, pp. 1-10, XP015144931.
International Search Report for corresponding application PCT/CN2022/106042 filed Jul. 15, 2022; Mail date Sep. 26, 2022.

* cited by examiner

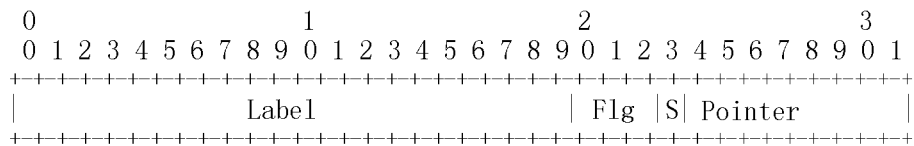
Fig. 1
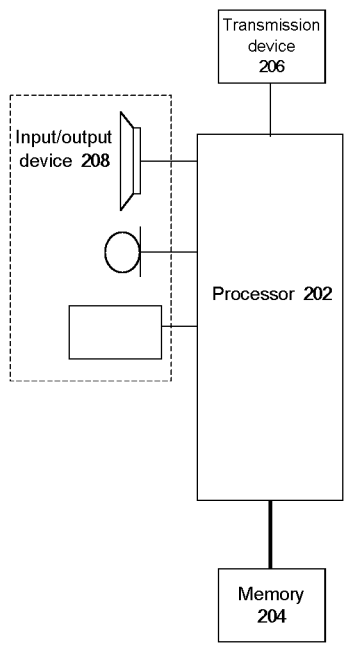
Fig. 2
An MPLS manage header is set in a stack bottom structure of an MPLS label stack. The MPLS manage header is located after a stack bottom label and prior to ancillary data; the MPLS manage header includes: a data type and offset length information of the ancillary data; and the stack bottom structure includes: the MPLS manage header and the ancillary data  — S302
Fig. 3

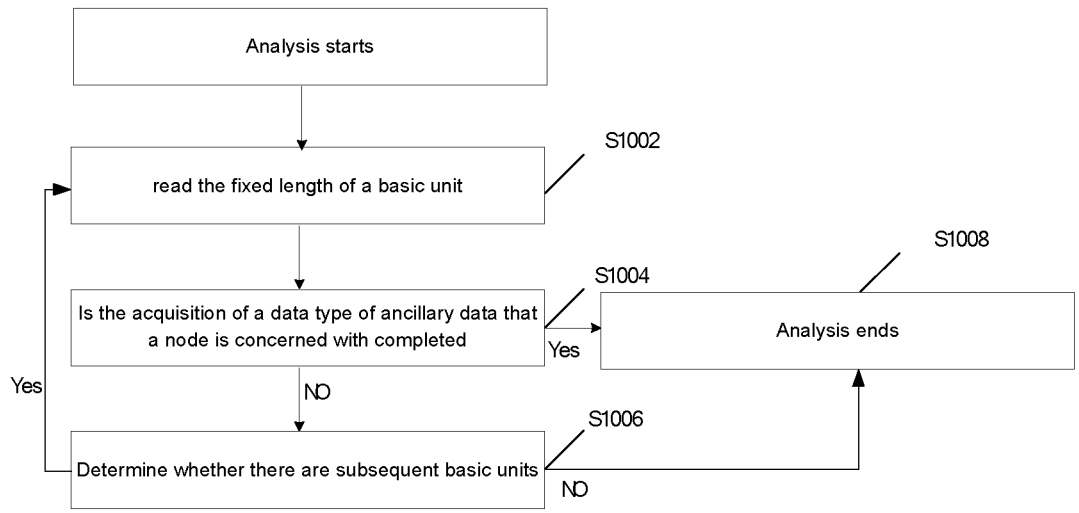

Fig. 10

```
+-+-+-+-+-+-+-+-+-+-+-+-+-+-+-+-+------------------
|  EH4   Info    |  EH3   Info   |
+-+-+-+-+-+-+-+-+-+-+-+-+-+-+-+-+  Manage Header
|  EH2   Info    | 0000000000000 |
+-+-+-+-+-+-+-+-+-+-+-+-+-+-+-+-+------------------
|          EH2  Data             |
+-+-+-+-+-+-+-+-+-+-+-+-+-+-+-+-+
|          EH3  Data             |  Ancillary Data
+-+-+-+-+-+-+-+-+-+-+-+-+-+-+-+-+
|          EH4  Data             |
+-+-+-+-+-+-+-+-+-+-+-+-+-+-+-+-+------------------
```

Fig. 11

```
+-+-+-+-+-+-+-+-+-+-+-+-+-+-+-+-+------------------
|  EH3   Info    |  EH2   Info   |
+-+-+-+-+-+-+-+-+-+-+-+-+-+-+-+-+  Manage Header
|  EH1   Info    |               |
+-+-+-+-+-+-+-+-+-+-+-+-+-+-+-+-+------------------
|          EH1  Data             |
+-+-+-+-+-+-+-+-+-+-+-+-+-+-+-+-+
|          EH2  Data             |  Ancillary Data
+-+-+-+-+-+-+-+-+-+-+-+-+-+-+-+-+
|          EH3  Data             |
+-+-+-+-+-+-+-+-+-+-+-+-+-+-+-+-+------------------
```

Fig. 12

MPLS MESSAGE ENCAPSULATION METHOD AND APPARATUS, AND STORAGE MEDIUM AND ELECTRONIC APPARATUS

CROSS-REFERENCE TO RELATED APPLICATION

The present disclosure is a national stage filing under 35 U.S.C. § 371 of international application number PCT/CN2022/106042, filed Jul. 15, 2022, which claims priority to Chinese Patent Application No. 202110971061.2 filed to the China National Intellectual Property Administration on Aug. 23, 2021, the disclosure of which is hereby incorporated by reference in its entirety.

TECHNICAL FIELD

The present disclosure relates to the field of communications, and specifically to a Multi-Protocol Label Switching (MPLS) message encapsulation method and apparatus, and a storage medium and an electronic apparatus.

BACKGROUND

The key to a Multi-Protocol Label Switching (MPLS) technology is the introduction of the concept of labels, which maps an Internet Protocol (IP) address into a simple label with a fixed length for different message forwarding and message switching technologies. After receiving data messages, an edge device in an MPLS network analyzes the content of the data messages, selects appropriate labels for these data messages, uses the labels to encapsulate the data messages, and sends same to the MPLS network.

Segment Routing (SR) is a method for routing forward based on a source address. A series of indication operations (also known as segment operations) are carried in a label stack (SR-MPLS) of a current MPLS network or a Segment Routing IPv6 (SRv6, segment routing based on an IPv6 forwarding plane) message header carried in an IPv6 message header, so as to indicate that data is routed in a network for transmission.

For certain services in MPLS/SR-MPLS networks, ancillary data needs to be carried at the bottom of a label stack of MPLS, such as a Generic Associated Channel Header (G-ACH) defined in RFC5586, for Operation Administration and Maintenance (OAM) services. The G-ACH is only used for end-to-end data carrying. The G-ACH is not processed at an intermediate node, and cannot be overlaid. At the bottom of the label stack, a special label needs to be carried to indicate that the G-ACH is carried later.

With the evolution of the network and the development of new services, more and more services require that data is carried after an MPLS label stack, for example, draft-li-mpls-enhanced-vpn-vtn-dd requires that slicing-related information is carried after the label stack; draft-gandhi-mpls-ioam-sr requires that IOAM data is carried after the label stack; in draft-stein-srtsn, information related to message forwarding time stamps may need to be carried at the stack bottom; in addition, the stack bottom may further carry metadata information of a Service Function Chain (SFC), etc.

Here, data related to services or data related to forwarding and carried after a label stack is collectively referred to as ancillary data.

Since original MPLS architectures cannot well meet the requirements, there have been some solutions at present. However, either solution has the following key issues.

1) How to indicate that data is carried at a stack bottom in a label stack. A current solution generally uses one or more labels in the stack for indication, regardless of the type of the labels, the labels are referred to together in embodiments of the present disclosure as indicator labels.

2) How to efficiently analyze ancillary data carried at the stack bottom. The current solution mainly includes two ideas.

One idea is similar to an IPv6 expansion header, which is used for defining a dedicated expansion header for data carried after an MPLS label stack. Since the chained analysis mode similar to IPv6 expansion header processing cannot directly acquire data that is interested by a current node, message processing efficiency is relatively low, which is also considered as one of the defects of the IPv6 expansion header.

The other idea is a mode proposed by draft-bryant-mpls-aux-data-pointer. In an indicator label, information is directly carried to indicate an offset, relative to the label, of the expansion header corresponding to the indicator label. As shown in FIG. 1, the first 20 bits of the label carry label values, and the last 11 bits (excluding S bits that represent the label is located at the stack bottom), where the first 3 bits represent offset units, and the last 8 bits are filled in with specific values of the offset. The technical solution also has significant defects. First, one indicator label can only correspond to one piece of stack-bottom data, and if a plurality of pieces of data are carried at the stack bottom, and a plurality of indicator labels need to correspond on a one-to-one basis, resulting in significant increase in the depth of the label stack; second, when a data size at the stack bottom is changeable, the offset in the indicator label varies accordingly, for MPLS, with regard to a scenario in which there may be a hop-by-hop change in the data size such as IOAM, each node requires a corresponding operation, and a label stack needs to be regenerated, leading to a very large processing cost, and furthermore, since the solution operates on labels, if an anomaly or malfunction occurs during the modification of the label stack, resulting in incorrect values of the labels, it may lead to abnormal message forwarding; and third, offset information is stored in the label stack, and is susceptible to changes in the label stack, resulting in poor expansibility of the solution, for example, in a scenario such as fault protection Fast Rerouting (FRR), if a label stack corresponding to a segment of protection path is pressed in a message, the offset in the indicator label may vary accordingly.

No effective solution has been proposed for problems in the related art of high complexity of an indication mode of MPLS ancillary data and low data analysis efficiency.

Therefore, it is necessary to improve the correlation techniques to overcome the defects in the related art.

SUMMARY

Embodiments of the present disclosure provide a Multi-Protocol Label Switching (MPLS) message encapsulation method and apparatus, and a storage medium and an electronic apparatus, to at least solve problems of high complexity, low efficiency, etc. of an indication mode of an MPLS label stack.

An aspect of an embodiment of the present disclosure provides an MPLS message encapsulation method, including: setting an MPLS manage header in a stack bottom structure of an MPLS label stack, where the MPLS manage header is located after a stack bottom label and prior to ancillary data; the MPLS manage header includes: a data type and offset length information of the ancillary data; and the stack bottom structure includes: the MPLS manage header and the ancillary data.

Another aspect of an embodiment of the present disclosure further provides an MPLS message encapsulation apparatus, including: a setting module, configured to set an MPLS manage header in a stack bottom structure of an MPLS label stack, where the MPLS manage header is located after a stack bottom label and prior to ancillary data; the MPLS manage header includes: a data type and offset length information of the ancillary data; and the stack bottom structure includes: the MPLS manage header and the ancillary data.

Another aspect of an embodiment of the present disclosure further provides a computer-readable storage medium. The computer-readable storage medium stores a computer program. The MPLS message encapsulation method is executed when the computer program is configured to be operated.

Another aspect of an embodiment of the present disclosure further provides an electronic apparatus, which includes a memory, a processor, and a computer program which is stored in the memory and executable on the processor. The processor executes the MPLS message encapsulation method by means of the computer program.

By means of the present disclosure, in the embodiments of the present disclosure, by introducing the MPLS manage header after the stack bottom label in the stack bottom structure and prior to the ancillary data, and summarizing, in the MPLS manage header, the type and offset length information of the ancillary data in the stack bottom structure, information for the ancillary data of the stack bottom structure can be acquired before the ancillary data is read, and indication complexity in the label stack is reduced, such that a node can determine, according to the MPLS manage header, whether the stack bottom structure carries a data type required to be processed locally, without reading the ancillary data to determine whether the stack bottom structure carries the data type required to be processed locally, thereby solving the technical problem that data cannot be efficiently indicated and analyzed when there are various data overlaying in the stack bottom structure of the MPLS label stack.

BRIEF DESCRIPTION OF THE DRAWINGS

The accompanying drawings described herein are used to provide a further understanding of the present disclosure, and constitute a part of the present disclosure. The exemplary embodiments of the present disclosure and the description thereof are used to explain the present disclosure, but do not constitute improper limitations to the present disclosure. In the drawings:

FIG. 1 is a schematic diagram of an indicator label carrying an offset of ancillary data in the related art.

FIG. 2 is a block diagram of a hardware structure of a computer terminal of an MPLS message encapsulation method according to an embodiment of the present disclosure.

FIG. 3 is a flowchart (I) of an MPLS message encapsulation method according to an embodiment of the present disclosure.

FIG. 10 is a schematic diagram of an analysis flow of an MPLS manage header according to an embodiment of the present disclosure.

FIG. 11 is a schematic diagram (I) of a message after ancillary data of an MPLS manage header is deleted according to an embodiment of the present disclosure.

FIG. 12 is a schematic diagram (II) of a message after ancillary data of an MPLS manage header is deleted according to an embodiment of the present disclosure.

DETAILED DESCRIPTION OF THE EMBODIMENTS

Figure 4:
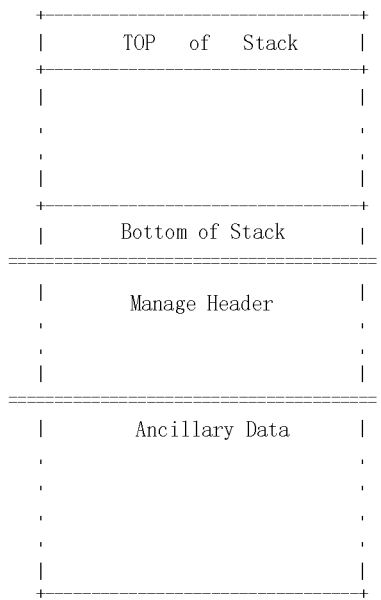
FIG. 4 is a schematic position diagram of an MPLS manage header according to an embodiment of the present disclosure.

In order to enable those skilled in the art to better understand the solutions of the present disclosure, the technical solutions in the embodiments of the present disclosure will be clearly and completely described below in combination with the drawings in the embodiments of the present disclosure. It is apparent that the described embodiments are only part of the embodiments of the present disclosure, not all the embodiments. Based on the embodiments in the present disclosure, all other embodiments obtained by those of ordinary skill in the art without creative work shall all fall within the protection scope of the present disclosure.

It is to be noted that terms "first", "second" and the like in the description, claims and the above-mentioned drawings of the present disclosure are used for distinguishing similar objects rather than describing a specific sequence or a precedence order. It should be understood that the data used in such a way may be exchanged where appropriate, in order that the embodiments of the present disclosure described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The method embodiments provided in the embodiments of the present disclosure may be executed in a computer terminal or a similar computing apparatus. For example, the method embodiments are operated on the computer terminal, FIG. 2 is a block diagram of a hardware structure of a computer terminal of an MPLS message encapsulation method according to an embodiment of the present disclosure. As shown in FIG. 2, the computer terminal may include one or more (there is only one shown in FIG. 2) processors 202 (the processors 202 may include, but are not limited to, a Microprocessor Unit (MPU) or a Programmable Logic Device (PLD) and a memory 204 configured to store data. In an exemplary embodiment, the computer terminal may further include a transmission device 206 configured to achieve a communication function and an input/output device 208. Those skilled in the art may understand that the structure shown in FIG. 2 is only a schematic diagram, which does not limit the structure of the above computer terminal. For example, the computer terminal may further include more or less components than those shown in FIG. 2, or have different configurations that are equivalent or more functional than those shown in FIG. 2.

The memory 204 may be configured to store a computer program, for example, a software program and a module of application software, such as a computer program corresponding to an MPLS message encapsulation method in the embodiments of the present disclosure. The processor 202 runs the computer program stored in the memory 204, so as to execute various functional applications and data processing, that is, to realize the above method. The memory 204 may include a high-speed random access memory, and may further include a non-volatile memory, such as one or more magnetic disk memory apparatuses, a flash memory device, or other non-volatile solid-state memory devices. In some examples, the memory 204 may further include memories remotely disposed relative to the processor 202. The remote memories may be connected to the computer terminal by using a network. Examples of the above network include, but are not limited to, the Internet, an intranet, a local area network, a mobile communication network, and a combination thereof.

The transmission apparatus 206 is configured to receive or send data via the network. The specific example of the above network may include a wireless network provided by a communication provider of the computer terminal. In an example, the transmission apparatus 206 includes a Network Interface Controller (NIC), and may be connected to other network devices by using a base station, so as to communicate with the Internet. In an example, the transmission apparatus 206 is a Radio Frequency (RF) module, which is configured to communicate with the Internet in a wireless manner.

FIG. 3 is a flowchart (I) of an MPLS message encapsulation method according to an embodiment of the present disclosure. As shown in FIG. 3, the encapsulation method includes the following step.

At S302, an MPLS manage header is set in a stack bottom structure of an MPLS label stack.

The MPLS manage header is located after a stack bottom label and prior to ancillary data; the MPLS manage header includes: a data type and offset length information of the ancillary data; and the stack bottom structure includes: the MPLS manage header and the ancillary data.

In the embodiments of the present disclosure, by introducing the MPLS manage header after the stack bottom label in the stack bottom structure and prior to the ancillary data, and summarizing, in the MPLS manage header, the type and offset length information of the ancillary data in the stack bottom structure, information for the ancillary data of the stack bottom structure can be acquired before the ancillary data is read, and indication complexity in the label stack is reduced, such that a node can determine, according to the MPLS manage header, whether the stack bottom structure carries a data type required to be processed locally, without reading the ancillary data to determine whether the stack bottom structure carries the data type required to be processed locally; and when it is determined that the stack bottom structure carries the data type required to be processed locally, the start position of the ancillary data is directly skipped to process the ancillary data according to the offset length information of the manage header, such that the technical problem, that data cannot be efficiently indicated and analyzed when there are various data overlaying in the stack bottom structure of the MPLS label stack, is solved.

It is to be noted that, an execution subject of S302 may be an encapsulation node, and the embodiments of the present disclosure are not limited thereto.

Further, after the MPLS manage header is set in the MPLS data structure, optionally, the MPLS manage header may be analyzed by an analysis node to determine whether the ancillary data includes a data type to be processed by a target node (hereafter referred to as node). The start position of the ancillary data is skipped to according to the offset length information when the ancillary data includes the data type to be processed by the target node. The offset length information is used for indicating data size to be offset from a current position to the start position.

Further, the MPLS manage header in S302 includes: length information of the ancillary data, or end offset information of the ancillary data. A difference between the end offset information and start offset information of the ancillary data is the length information of the ancillary data.

Further, the MPLS message encapsulation method further includes: in an optional embodiment, reading an indicator label corresponding to the stack bottom structure, so as to determine whether the stack bottom structure carries the ancillary data.

Further, the MPLS message encapsulation method further includes: in an optional embodiment, executing the following solutions through the encapsulation node: when it is detected that there is a change in the ancillary data, modifying the data type and offset length information of the ancillary data comprised in the MPLS manage header, so as to correspond the modified data type and offset length information to the changed ancillary data.

Further, the MPLS message encapsulation method further includes: the situation that there is a change in the ancillary data including at least one of the following: there is a change in the data size of the ancillary data, the ancillary data is deleted, or new ancillary data is inserted.

Further, the MPLS manage header in S302 includes: one or more basic units. Each basic unit includes one or more pieces of ancillary data information.

Further, any one of the basic units in the MPLS manage header in S302 includes indicating whether there is any subsequent Flag information for the basic unit.

Further, the MPLS manage header in S302 includes number of basic unit information. The number of basic unit information is used for indicating the number of the basic units in the MPLS manage header, and it is determined that there are subsequent basic units when the number of the basic units that has been analyzed is less than the number of basic unit information.

Next, the MPLS message encapsulation method is further described with reference to the following embodiments.

Embodiment 1

In order to efficiently analyze an MPLS message, this embodiment of the present disclosure newly introduces a data structure, which is called an MPLS manage header (hereafter referred to as manage header). FIG. 4 is a schematic position diagram of an MPLS manage header according to an embodiment of the present disclosure. As shown in FIG. 4, the manage header (i.e. Manage Header in FIG. 4) is located after a stack bottom label (i.e. Bottom of Stack in FIG. 4) and prior to all ancillary data (i.e. Ancillary Data in FIG. 4).

It is to be noted that, the manage header is used for storing ancillary data information, and the ancillary data is used for indicating the data type of the ancillary data carried in the stack bottom structure and information on how to read the ancillary data. During the process of indicating the information on how to read the ancillary data, the ancillary data information needs to include at least start offset information. The start offset information is a data size that needs to be offset to reach a start position of the corresponding ancillary data, starting from the manage header, or from a position of the manage header.

Optionally, in order to completely rely on the manage header to acquire complete ancillary data without relying on the format of the ancillary data (i.e., cases where the ancillary data may not include self-length information), the manage header may further include length information of the ancillary data, or include end offset information, such that the length information of the ancillary data may be directly or indirectly acquired from the manage header. The end offset information represents a data size that needs to be offset to reach an end position of the corresponding ancillary data, starting from the manage header, or from a position of the manage header. The length information of the corresponding ancillary data may be acquired according to the difference between the end offset information and the start offset information.

Figure 5:
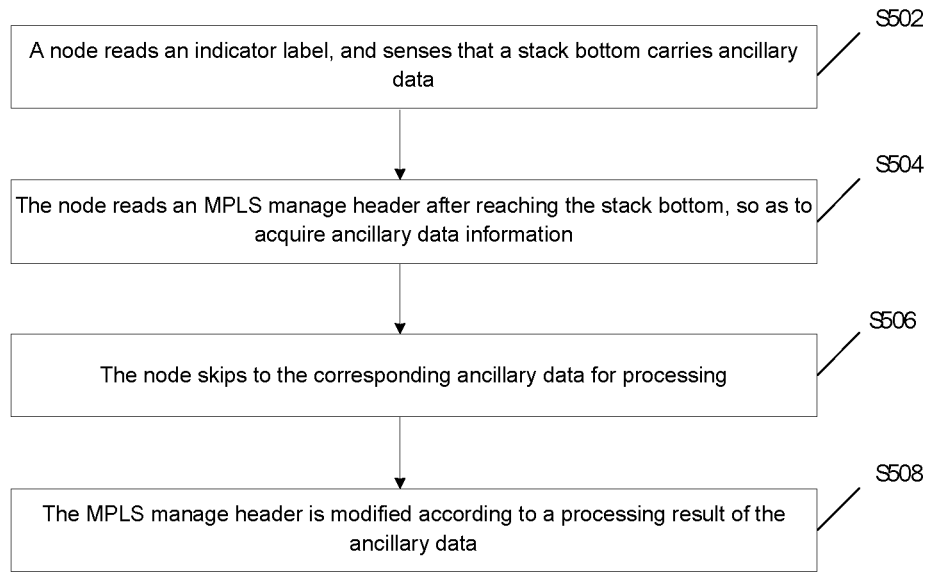
FIG. 5 is a flowchart (II) of an MPLS message encapsulation method according to an embodiment of the present disclosure.

FIG. 5 is a flowchart (I) of an MPLS message encapsulation method according to an embodiment of the present disclosure. As shown in FIG. 5, the encapsulation method includes the following steps.

At S502, a node reads an indicator label, and senses that the stack bottom structure carries the ancillary data. Since a specific data type is indicated in the manage header, in the simplest case, regardless of how much data the stack bottom structure carries, only one indicator label is required to indicate that the stack bottom structure carries the ancillary data, such that the depth of a label stack is not significantly increased.

In addition, the indicator label may also indicate that data carried in the stack bottom structure is data required to be processed hop by hop or data required to be processed end to end. If a node is an intermediate node of a path, and the indicator label indicates that the data carried in the stack bottom structure is the data required to be processed end to end, i.e. the data that only needs to be processed at the end of the path, the intermediate node does not need to continuously read the data from the stack bottom structure.

In this embodiment of the present disclosure, a storage position and read mode of the indicator label are not limited. For example, in an embodiment, a mode in draft-bryant-mpls-aux-data-pointer may be used, i.e. the storage position of the indicator label is fixed and immediately after a top-of-stack label, then after reading the top-of-stack label, the node continues to read the indicator label. Alternatively, a mode of directly carrying the indicator label in the stack bottom structure may also be used, and the node directly determines, at the position of the stack bottom structure, whether there is an indicator label. Alternatively, a mode of an indicator label similar to an entropy label in RFC8662 may also be used, the storage position of the indicator label is not fixed, and the node needs to scan a label stack to find the indicator label. Regardless of the mode in which the indicator label is carried as described above, either of the above modes may be used in conjunction with the method for analyzing the manage header in this embodiment of the present disclosure, as long as it indicates that the ancillary data is carried after the MPLS label stack.

At S504, the node reads the MPLS manage header after reaching the stack bottom structure, so as to acquire the ancillary data information. According to the indication of the indicator label, if the node needs to read the ancillary data after reaching the stack bottom structure, the node reads the MPLS manage header after directly reaching the stack bottom label. The manage header includes information of all ancillary data, and at least includes the data type and offset length information of the ancillary data.

It is to be noted that, the indicator label may be used for indicating whether the ancillary data is hop-by-hop or end-to-end. However, further, whether the node needs to process the ancillary data of the stack bottom structure depends on service requirements, and what types of data the node is specifically concerned with locally. The node may acquire data type information of the carried ancillary data by reading the data type of the ancillary data in the manage header.

It is to be noted that, the data type that the node is concerned with is the data type to be processed by the target node.

At S506, the node skips to the corresponding ancillary data for processing. If there is a data type that the node is concerned with locally, S506 is executed, and the beginning (equivalent to the start position of the ancillary data in the above embodiment) of the corresponding ancillary data is directly skipped to through the offset length information for processing. If there is no data type that the node is concerned with, the ancillary data is not processed, and a message may be forwarded according to original flows.

It is to be noted that, there may be a change in the length information of the ancillary data, or the mode may insert or delete some ancillary data.

Once the ancillary data of the stack bottom structure undergoes the above change, S508 is executed.

At S508, the MPLS manage header is modified according to a processing result of the ancillary data. The corresponding node needs to modify corresponding ancillary data information in the MPLS manage header. Compared with the modification of the MPLS label stack in draft-bryant-mpls-aux-data-pointer, in this embodiment, since the manage header is located after the label stack, modification actions for a plurality of labels are not involved in the label stack. On one hand, a process of realizing the modification of the manage header is relatively simple, and on the other hand, even if there is an error in the process of modifying the manage header, a basic forwarding flow based on the label stack is not affected. In addition, since the manage header is located after the label stack, the content of the manage header is not affected, regardless of how the label stack changes.

It is to be noted that, a message format diagram in this embodiment of the present disclosure is only an example and does not limit the size of each field in a message.

Embodiment 2

A possible format of the MPLS manage header, as well as a corresponding manage header analysis mode, in this embodiment may be specifically described with reference to the drawings.

In an embodiment, the MPLS manage header may consist of one or more basic units. Each basic unit includes one or more pieces of ancillary data information. The basic unit may be a fixed length as agreed, and a node reads the fixed length every time when analyzing the manage header. The manage header may further include information indicating whether there are subsequent basic units.

It is to be noted that, the indication information may be understood as Flag information indicating whether there are subsequent basic units. When analyzing one basic unit of the manage header, the node may determine, according to the indication information, whether there are other basic units after the basic unit.

Figure 6:
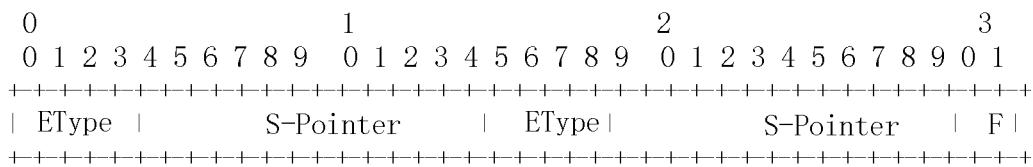
FIG. 6 is a schematic format diagram of a basic unit of an MPLS manage header according to an embodiment of the present disclosure.

FIG. 6 is a schematic format diagram of a basic unit of an MPLS manage header according to an embodiment of the present disclosure. As shown in FIG. 6, the basic unit is a fixed length. In this embodiment, the format of the basic unit of the MPLS manage header is described by using a 32-bit basic unit as an example.

In FIG. 6, an F field represents a Flag, and whether there are subsequent basic units is indicated through the value of the Flag. For example, it may be defined that, when F=01, it indicates that the basic unit is followed by the basic unit; and it may also be defined that, when F=00, it indicates that there is no other basic unit after the basic unit, that is to say, the basic unit is the last basic unit in the manage header.

An EType field represents a type of the ancillary data after the manage header. EType=0 represents that there is no corresponding ancillary data.

A subsequent S-Pointer field represents the start offset information of the ancillary data. In an embodiment, the field may directly carry an offset of a designated unit. For example, the designated unit is a byte or a bit, such that the field may directly carry the number of bytes or the number of bits. The field may also carry a length value and corresponding unit information by using a mode in draft-bryant-mpls-aux-data-pointer, for example, the length value is 10, and the unit is byte; or information about multiples of an agreed length is carried, for example, an agreed fixed length is 4 bytes, and if the value of S-Pointer is 10, it represents that the offset is 40 bytes, regardless of the form, as long as a corresponding offset can be acquired.

Figure 7:
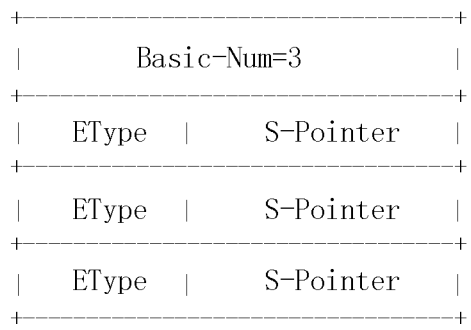
FIG. 7 is a schematic format diagram (I) of an MPLS manage header according to an embodiment of the present disclosure.

FIG. 7 is a schematic format diagram (I) of an MPLS manage header according to an embodiment of the present disclosure. As shown in FIG. 7, the embodiment in FIG. 7 differs from the mode of indicating, through the Flag, whether there are subsequent basic units in FIG. 6. In this embodiment, the number Basic-Num of the basic units is carried in the manage header. When analyzing the manage header, a node still reads the basic units with a fixed length first, and then compares the number of the basic units that have been analyzed with the Basic-Num; when the number of the basic units that have been analyzed is less than the Basic-Num, it represents that there are subsequent basic units; and when the number of the basic units that have been analyzed is equal to the Basic-Num, it represents that the last basic unit has been reached.

Since the manage header directly carries the offset, a storage sequence of the information of the ancillary data in the manage header may theoretically have no correlation with a sequence of the ancillary data carried in the stack bottom structure, but generally, a sequential storage or inverted sequence storage mode may be used. The basic units of the ancillary data information that is less than 32 bits are made up with 0s.

Figure 8:
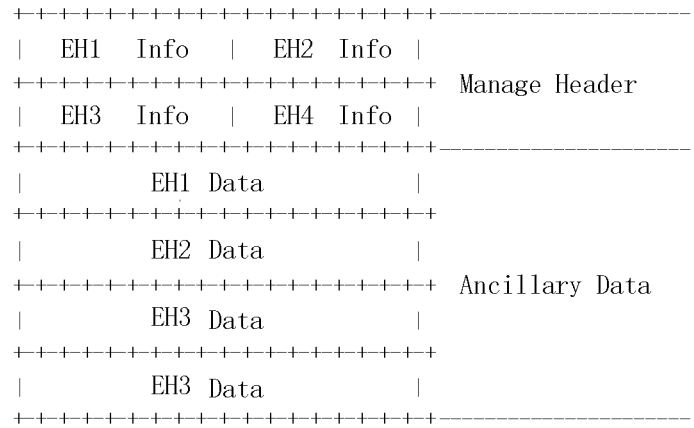
FIG. 8 is a schematic diagram (I) of a storage sequence of ancillary data information of an MPLS manage header according to an embodiment of the present disclosure.
Figure 9:
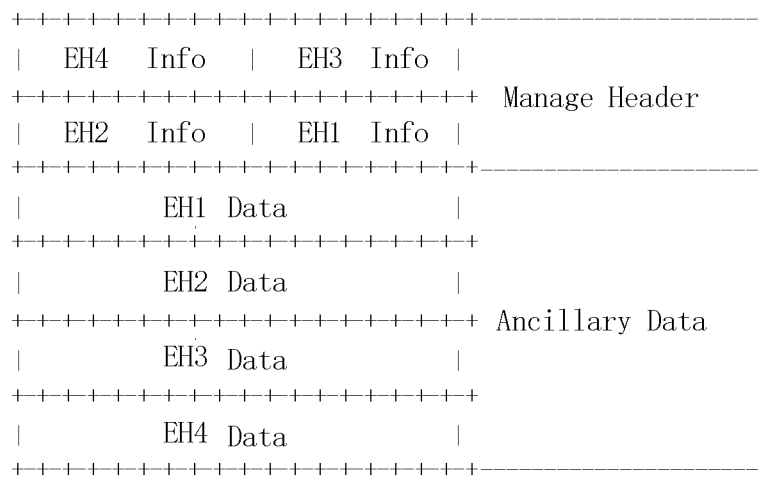
FIG. 9 is a schematic diagram (II) of a storage sequence of ancillary data information of an MPLS manage header according to an embodiment of the present disclosure.

The sequential storage or inverted sequence storage mode is described with reference to FIG. 8 and FIG. 9. FIG. 8 is a schematic diagram (I) of a storage sequence of ancillary data information of an MPLS manage header according to an embodiment of the present disclosure. FIG. 9 is a schematic diagram (II) of a storage sequence of ancillary data information of an MPLS manage header according to an embodiment of the present disclosure. FIG. 8 shows the sequential storage mode, and FIG. 9 shows the inverted sequence storage mode. The first piece of data information in the manage header corresponds to the last piece of ancillary data carried in the stack bottom structure, the second piece of data information in the manage header corresponds to the last second piece of ancillary data carried in the stack bottom structure, and so on.

FIG. 10 is a schematic diagram of an analysis flow of an MPLS manage header according to an embodiment of the present disclosure. As shown in FIG. 10, the MPLS manage header analysis flow includes the following steps.

At S1002, for the manage header of the format, when analyzing the manage header, the node first reads the fixed length of the basic unit.

It is to be noted that, the fixed length in this embodiment is 32 bits.

At S1004, ancillary data information in the basic unit is acquired, and whether there is a data type of the ancillary data of concern in the ancillary data information is determined.

For example, the current node is only concerned with data of an IOAM type. If the basic unit is found to include Type of the type IOAM when being read, analysis does not need to be continued; and if a data type that the current node is concerned with has not been found after the basic unit is read, S1006 is executed.

At S1006, whether the basic unit is followed by subsequent basic units is determined according to the F field; if there is no subsequent basic unit, S1008 of ending the analysis flow is executed; and if there are subsequent basic units, S1002 is executed.

At S1008, the analysis flow ends.

After the node is used to analyze the manage header to acquire the data type and the corresponding offset length of concern of the current node, the corresponding ancillary data is skipped to from the corresponding basic units according to the offset length. Possible operations for the ancillary data include the following operations.

Operation 1), a content read operation: only content of the ancillary data is read, and no modification is made to data.

Operation 2), a content modification operation: the content of the ancillary data is modified, but a data size is not changed.

Operation 3), a size modification operation: the ancillary data is modified, and the data size is changed.

Operation 4), a data deletion operation: the ancillary data is deleted.

Operation 5), a data insertion operation: new ancillary data is inserted.

The Operation 1) and the Operation 2) respectively correspond to an operation scenario 1) and an operation scenario 2). In the operation scenario 1) and the operation scenario 2), after the ancillary data is processed, the manage header is not changed.

The Operation 3) corresponds to an operation scenario 3). In the operation scenario 3), if the current ancillary data is the last piece in all ancillary data, the offset does not need to be changed, otherwise for all ancillary data after the current ancillary data, the manage header needs to modify the offsets of these ancillary data.

The Operation 4) corresponds to an operation scenario 4). In the operation scenario 4), after the ancillary data is deleted, corresponding ancillary data information in the manage header needs to be deleted.

One possible mode is to set the corresponding ancillary data information to all 0s, when subsequent nodes read the manage header, for the ancillary data information with Type being 0, it is assumed that there is no corresponding ancillary data, and a next piece of ancillary data information continues to be read.

Next, a message that deletes the ancillary data is further described.

As shown in FIG. 11, if ancillary data EH1 is deleted, information of original EH1 in the manage header is reset to 0. Accordingly, if the ancillary data deleted is not the last piece, the offset of the ancillary data relative to the basic unit in the manage header changes, and the node also needs to perform corresponding modification on the offset length information in the manage header.

The other possible mode is to regenerate the manage header according to the state of the ancillary data processed by the node.

As shown in FIG. 12, when the node receives the message, three pieces of ancillary data EH1, EH2, and EH3 are carried in the stack bottom structure.

Figure 13:
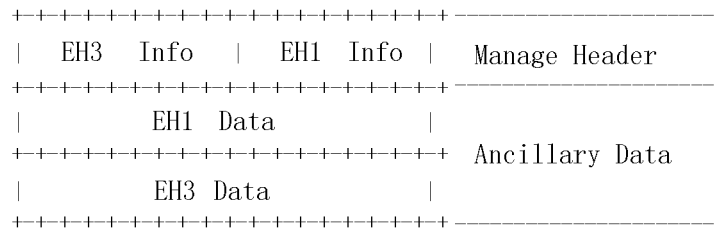
FIG. 13 is a schematic diagram (III) of a message after ancillary data of an MPLS manage header is deleted according to an embodiment of the present disclosure.

After the node deletes EH2, the manage header is regenerated, as shown in FIG. 13.

The Operation 5) corresponds to an operation scenario 5). A process of the data insertion operation of the operation scenario 5) is similar to a process of deleting the ancillary data in the operation scenario 4). If the node inserts the ancillary data, corresponding auxiliary information needs to be newly added to the manage header; and if a data offset changes due to data insertion, the corresponding offset information in the manage header is modified. In order to minimize the impact of data insertion, an inverted sequence insertion mode is recommended, i.e., the inserted data is stored at the end of all ancillary data, and the information of the data is stored at the top of the manage header.

Figure 14:
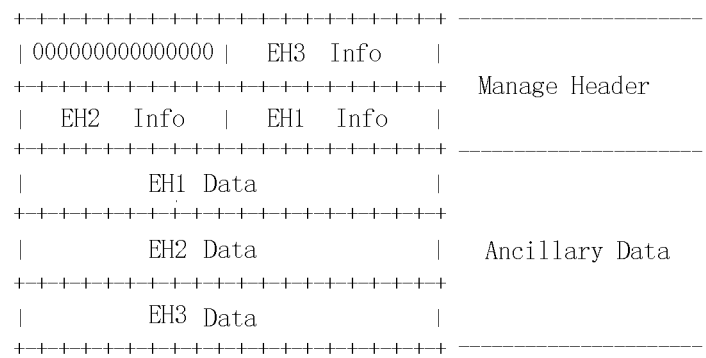
FIG. 14 is a schematic diagram of a message after ancillary data of an MPLS manage header is newly added according to an embodiment of the present disclosure.

A message after the node inserts the ancillary data may be understood with reference to FIG. 14. FIG. 14 is a schematic diagram of a message after ancillary data of an MPLS manage header is newly added according to an embodiment of the present disclosure. As shown in FIG. 14, EH3 is the ancillary data newly added by the node.

The manage header may also use a non-fixed length mode, and the manage header in the non-fixed length mode is described with reference to FIG. 15.

Figure 15:
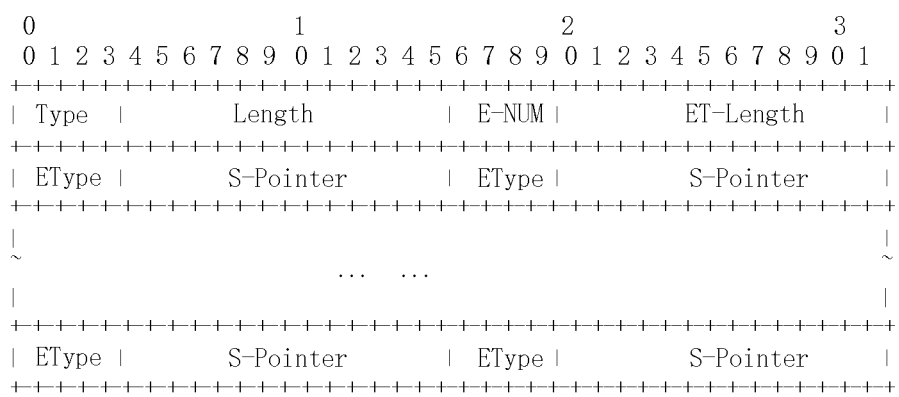
FIG. 15 is a schematic format diagram (II) of an MPLS manage header according to an embodiment of the present disclosure.

FIG. 15 provides another possible form of the manage header. FIG. 15 is a schematic format diagram (II) of an MPLS manage header according to an embodiment of the present disclosure. As shown in FIG. 15, in FIG. 15, the following information is included.

Type indicates that the segment of data is the MPLS manage header.

Length represents a total length of the MPLS manage header.

EType represents the type of the ancillary data.

S-Pointer represents a start offset of the ancillary data, which may be an offset starting from the manage header to the beginning of the ancillary data, and may also be an offset starting from data at the row of the manage header to the beginning of the ancillary data.

Optionally, the manage header may further include information about the total number (E-NUM) of ancillary data and the total length (ET-Length) of the ancillary data, and the length does not include the manage header, making it easy to skip all ancillary data to reach Payload directly.

When the node processes the manage header, the total length of the manage header needs to be acquired according to Length information, such that subsequent offset is performed to find the corresponding ancillary data. EType information and ELength information are read in sequence, until all the ancillary data information that the node is concerned with is acquired or the manage header is read.

Similar to the above manage header, when the data size of the ancillary data changes, or the ancillary data is inserted, or the ancillary data is deleted, the corresponding offset needs to be modified, and information about the total length ET-Length of the ancillary data also needs to be modified. Information about the total number (E-NUM) of the ancillary data needs to be modified after the ancillary data is inserted or the ancillary data is deleted. In addition, if the size of the manage header changes, total length information in the manage header also needs to be modified.

In an embodiment, a process of reading the ancillary data may include the following steps.

At S1, when the ancillary data is read according to the start offset information, starting from a corresponding position in the manage header, specified start offset information is offset to first find the beginning of the ancillary data.

At S2, length information of the ancillary data is then acquired by reading self-length information included in the ancillary data.

At S3, the ancillary data is then read within a length range, and this method is suitable for the ancillary data that carries its own length information; or for some specific types of ancillary data, a length is a fixed value that is determined in advance, and starting from the ancillary data, a fixed length value is read to acquire the ancillary data.

In addition to carrying the start offset, the manage header may further include the length information of the ancillary data, or include end offset information, such that the length of the ancillary data may be directly or indirectly acquired from the manage header. The end offset information represents a data size that needs to be offset to reach an end position of the corresponding ancillary data, starting from the manage header, or from a position of the manage header. The length information of the corresponding ancillary data may be acquired according to the difference between an end offset and the start offset. In this case, the ancillary data is not required to carry the self-length information.

Figure 16:
FIG. 16 is a schematic diagram (I) of an MPLS manage header carrying ancillary data according to an embodiment of the present disclosure.

FIG. 16 is a schematic diagram (I) of an MPLS manage header carrying ancillary data according to an embodiment of the present disclosure. As shown in FIG. 16, FIG. 16 shows the state of the end offset carried in the manage header. EType and S-Pointer have the same meaning as the above, and E-Pointer represents the end offset.

Figure 17:
FIG. 17 is a schematic diagram (II) of an MPLS manage header carrying ancillary data according to an embodiment of the present disclosure.

FIG. 17 is a schematic diagram (II) of an MPLS manage header carrying ancillary data according to an embodiment of the present disclosure. As shown in FIG. 17, FIG. 17 shows the length information of the ancillary data carried in the manage header. EType and S-Pointer have the same meaning as the above, and E-Length represents the length information of the corresponding ancillary data.

Embodiment 3

Figure 18:
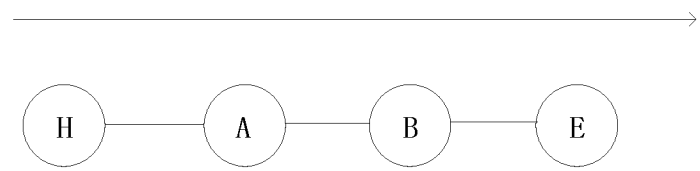
FIG. 18 is a schematic diagram of a Label Switched Path (LSP) according to an embodiment of the present disclosure.

FIG. 18 is a schematic diagram of an LSP according to an embodiment of the present disclosure. As shown in FIG. 18, FIG. 18 provides the LSP in an SR-MPLS network. IOAM information A, B, and E all need to be processed, slice information A and E need to be processed, and only E in flow identifier information needs to be concerned with.

A fixed indicator label position mode in draft-bryant-mpls-aux-data-pointer-00 and an SWAP mode are used in this embodiment, i.e., the indicator label immediately follows the topmost label, after processing a top-layer label, the node peels off an MPLS label and swaps the position of the indicator label with a next forwarding label to be processed, such that the next forwarding label to be processed is at the topmost layer and is forwarded to a next node according to the label.

Figure 19:
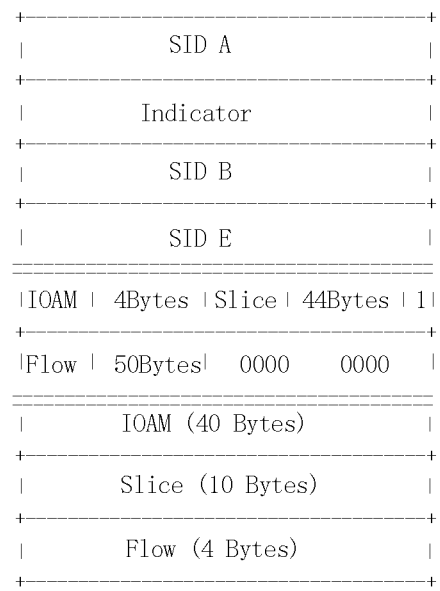
FIG. 19 is a schematic diagram (I) of a node message according to an embodiment of the present disclosure.

FIG. 19 is a schematic diagram (I) of a node message according to an embodiment of the present disclosure. A message sent by Node H is shown in FIG. 19, a label Indicator indicates that the ancillary data is carried in the stack bottom structure of the label stack, and a Segment Identifier (SID) A, an SID B, and an SID E respectively correspond to SR-MPLS SID of Node A, Node B, and Node E.

After the message reaches the Node A, the Node A senses that the ancillary data is carried in the stack bottom structure by reading the Indicator, and the Node A is concerned with the IOAM information and the slice information according to local configurations. The Node A first reaches the stack bottom structure to read the first basic unit of the manage header, i.e. the first 32 bits, and acquires that the stack bottom structure carries IOAM and slice data and offset information thereof. Since A has acquired data information that the current node is concerned with, although F=1 in the basic unit, the manage header is no longer read. The Node A separately finds the beginning of the IOAM and the beginning of the slice data according to the offset for corresponding processing.

After data processing is completed, IOAM data is 44 bytes, which is increased by 4 bytes, and the size of the slice data is unchanged. Accordingly, the offsets of the data after the IOAM changes, which are all increased by 4 bytes, and corresponding modification needs to be performed in the manage header.

Figure 20:
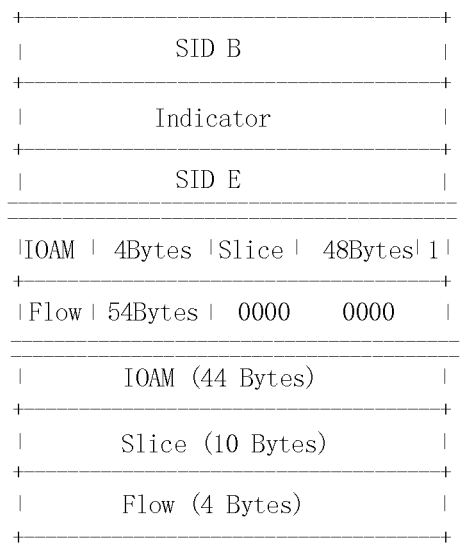
FIG. 20 is a schematic diagram (II) of a node message according to an embodiment of the present disclosure.

FIG. 20 is a schematic diagram (II) of a node message according to an embodiment of the present disclosure. As shown in FIG. 20, FIG. 20 shows a message sent by the Node A. In the label stack, the Node A peels off the SID A, and swaps the position of the SID B with the Indicator; and after the label stack, the Node A modifies slices in the manage header and offset information of a flow identifier.

Figure 21:
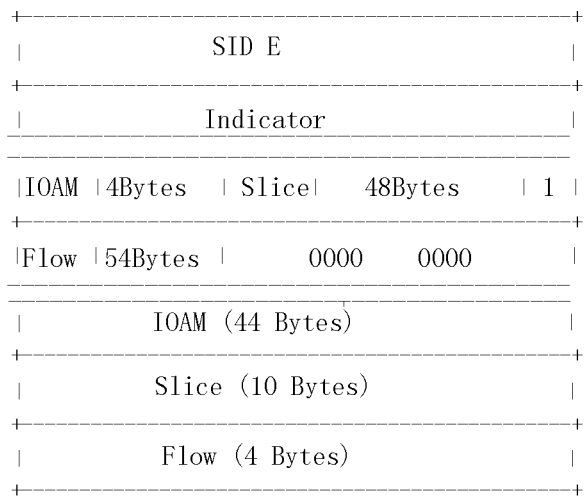
FIG. 21 is a schematic diagram (III) of a node message according to an embodiment of the present disclosure.

FIG. 21 is a schematic diagram (III) of a node message according to an embodiment of the present disclosure. As shown in FIG. 21, FIG. 21 shows a message sent by the Node B. After receiving the message, similarly, the Node B senses, by reading the Indicator, that the ancillary data is carried in the stack bottom structure; and the Node B is concerned with the slice information according to local configurations. The Node B first reaches the stack bottom structure to read the first basic unit of the manage header, i.e. the first 32 bits, and acquires that the stack bottom structure carries the slice data and offset information thereof. Since B has acquired data information that the current node is concerned with, although F=1 in the basic unit, the manage header is no longer read. The Node B finds the beginning of the slice data according to the offset for corresponding processing.

The size of the slice data processed by the Node B is unchanged, such that the manage header does not need to be modified.

After receiving the message, the Node E senses, by reading the Indicator, that data is carried in the stack bottom structure; the IOAM, the slices, and the flow information all need to be processed according to local service configurations; and the first basic unit of the manage header is read by reaching the stack bottom structure, i.e. the first 32 bits, and that the stack bottom structure carries the IOAM and the slice data and offset information thereof is acquired. Since not all data information that the current node is concerned with has been acquired yet, and F=1 in the basic unit, a next basic unit of the manage header continues to be read, so as to acquire flow identifier data information. The Node E separately finds the beginning of the corresponding ancillary data for processing according to the offset.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present disclosure.

This embodiment further provides an MPLS message encapsulation apparatus. The apparatus is configured to implement the above embodiments and preferred implementations, and what has been described will not be described again. As used below, the term "module" may be a combination of software and/or hardware that implements a predetermined function. Although the device described in the following embodiments is preferably implemented in software, but implementations in hardware, or a combination of software and hardware, are also possible and conceived.

Figure 22:
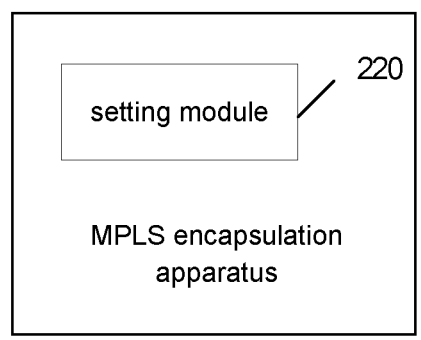
FIG. 22 is a structural block diagram of an MPLS message encapsulation apparatus according to an embodiment of the present disclosure.

FIG. 22 is a structural block diagram of an MPLS message encapsulation apparatus according to an embodiment of the present disclosure. As shown in FIG. 22, the MPLS message encapsulation apparatus includes a setting module.

The setting module 220 is configured to set an MPLS manage header in a stack bottom structure of an MPLS label stack. The MPLS manage header is located after a stack bottom label and prior to ancillary data; the MPLS manage header includes: a data type and offset length information of the ancillary data; and the stack bottom structure includes: the MPLS manage header and the ancillary data.

In the embodiments of the present disclosure, by introducing the MPLS manage header after the stack bottom label in the stack bottom structure and prior to the ancillary data, and summarizing, in the MPLS manage header, the type and offset length information of the ancillary data in the stack bottom structure, information for the ancillary data of the stack bottom structure can be acquired before the ancillary data is read, and indication complexity in the label stack is reduced, such that a node can determine, according to the MPLS manage header, whether the stack bottom structure carries a data type required to be processed locally, without reading the ancillary data to determine whether the stack bottom structure carries the data type required to be processed locally; and when it is determined that the stack bottom structure carries the data type required to be processed locally, the start position of the ancillary data is directly skipped to process the ancillary data according to the offset length information of the manage header, such that the technical problem, that data cannot be efficiently indicated and analyzed when there are various data overlaying in the stack bottom structure of the MPLS label stack, is solved.

Further, the MPLS manage header includes: length information of the ancillary data, or end offset information of the ancillary data. A difference between the end offset information and start offset information of the ancillary data is the length information of the ancillary data.

Further, the MPLS manage header includes: one or more basic units with a fixed length. Each basic unit includes one or more pieces of ancillary data information.

Further, the situation that there is a change in the ancillary data includes at least one of the following: there is a change in the data size of the ancillary data, the ancillary data is deleted, or new ancillary data is inserted.

Further, the MPLS manage header includes number of basic unit information. The number of basic unit information is used for indicating the number of the basic units in the MPLS manage header, and it is determined that there are subsequent basic units when the number of the basic units that has been analyzed is less than the number of basic unit information.

Further, any one of the basic units in the MPLS manage header includes indicating whether there is any subsequent Flag information for the basic unit.

Further, the MPLS message encapsulation apparatus further includes an analysis module, read module, and a detection module.

The analysis module is configured to analyze the MPLS manage header after the MPLS manage header is set in the MPLS data structure, so as to determine whether the ancillary data includes a data type to be processed by a target node; and skip to a start position of the data type according to the offset length information when the ancillary data includes the data type to be processed by the target node. The offset length information is used for indicating data size to be offset from a current position to the start position.

The read module is configured to read an indicator label corresponding to the stack bottom structure, so as to determine whether the stack bottom structure carries the ancillary data.

The detection module is configured to, when it is detected that there is a change in the ancillary data, modify the data type and offset length information of the ancillary data included in the MPLS manage header, so as to correspond the modified data type and offset length information to the changed ancillary data.

In an exemplary embodiment, the computer-readable storage medium may include, but is not limited to, a USB flash disk, a Read-Only Memory (ROM), a Random Access Memory (RAM), and various media that can store computer programs, such as a mobile hard disk, a magnetic disk, or an optical disk.

For specific examples in this embodiment, refer to the examples described in the foregoing embodiments and the exemplary implementations, and this embodiment will not be repeated thereto.

This embodiment of the present disclosure further provides an electronic apparatus. The electronic apparatus includes a memory and a processor. The memory is configured to store a computer program. The processor is configured to run the computer program to execute steps in any one of method embodiments described above.

Optionally, in this embodiment, the processor may be configured to perform the following steps through the computer program.

At S1, an MPLS manage header is set in a stack bottom structure of an MPLS label stack, where the MPLS manage header is located after a stack bottom label and prior to ancillary data; the MPLS manage header includes: a data type and offset length information of the ancillary data; and the stack bottom structure includes: the MPLS manage header and the ancillary data.

In an exemplary embodiment, the electronic apparatus may further include a transmission device and an input/output device. The transmission device is connected to the processor. The input/output device is connected to the processor.

For specific examples in this embodiment, refer to the examples described in the foregoing embodiments and the exemplary implementations, and this embodiment will not be repeated thereto.

It is apparent that those skilled in the art should understand that the above-mentioned modules or steps of the present disclosure may be implemented by a general computing device, and may also be gathered together on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the present disclosure is not limited to any specific combination of hardware and software.

The above are only the preferred embodiments of the disclosure and are not intended to limit the disclosure. For those skilled in the art, the disclosure may have various modifications and variations. Any modifications, equivalent replacements, improvements and the like made within the principle of the disclosure shall fall within the scope of protection of the present disclosure.

What is claimed is:

1. A Multi-Protocol Label Switching (MPLS) message encapsulation method, comprising:
    setting an MPLS manage header in a stack bottom structure of an MPLS label stack, wherein the MPLS manage header is located after a stack bottom label and prior to ancillary data; the MPLS manage header comprises: a data type and offset length information of the ancillary data;
    and the stack bottom structure comprises: the MPLS manage header and the ancillary data.

2. The MPLS message encapsulation method according to claim 1, wherein after setting the MPLS manage header in the MPLS data structure, the method further comprises:
    analyzing the MPLS manage header to determine whether the ancillary data comprises a data type to be processed by a target node; and
    skipping to a start position of the data type according to the offset length information when the ancillary data comprises the data type to be processed by the target node, wherein the offset length information is used for indicating data size to be offset from a current position to the start position.

3. The MPLS message encapsulation method according to claim 2, wherein the MPLS manage header comprises length information of the ancillary data, or end offset information of the ancillary data, wherein a difference between the end offset information and start offset information of the ancillary data is the length information of the ancillary data.

4. The MPLS message encapsulation method according to claim 1, further comprising:
    reading an indicator label corresponding to the stack bottom structure, so as to determine whether the stack bottom structure carries the ancillary data.

5. The MPLS message encapsulation method according to claim 3, further comprising:
    when it is detected that there is a change in the ancillary data, modifying the data type and offset length information of the ancillary data comprised in the MPLS manage header, so as to correspond the modified data type and offset length information to the changed ancillary data.

6. The MPLS message encapsulation method according to claim 5, wherein the situation that there is a change in the ancillary data comprises at least one of the following: there is a change in the data size of the ancillary data, the ancillary data is deleted, or new ancillary data is inserted.

7. The MPLS message encapsulation method according to claim 1, wherein the MPLS manage header comprises one or more basic units, and each basic unit comprises one or more pieces of ancillary data information.

8. The MPLS message encapsulation method according to claim 7, wherein any one of the basic units in the MPLS manage header comprises flag information indicating whether there is any subsequent basic unit.

9. The MPLS message encapsulation method according to claim 7, wherein the MPLS manage header comprises number of basic unit information, and the number of basic unit information is used for indicating the number of the basic units in the MPLS manage header, and it is determined that there are subsequent basic units when the number of the basic units that has been analyzed is less than the number of basic unit information.

10. A Multi-Protocol Label Switching (MPLS) message encapsulation apparatus, comprising:
    a setting module, configured to set an MPLS manage header in a stack bottom structure of an MPLS label stack, wherein the MPLS manage header is located after a stack bottom label and prior to ancillary data; the MPLS manage header comprises: a data type and offset length information of the ancillary data; and the stack bottom structure comprises: the MPLS manage header and the ancillary data.

11. A non-transitory computer-readable storage medium, having a computer program stored therein, wherein the computer program is configured to cause, when being executed by a processor, the processor to perform the method according to claim 1.

12. An electronic apparatus, comprising a memory and a processor, wherein the memory stores a computer program; and the processor is configured to execute the computer program to:
    set an MPLS manage header in a stack bottom structure of an MPLS label stack, wherein the MPLS manage header is located after a stack bottom label and prior to ancillary data: the MPLS manage header comprises: a data type and offset length information of the ancillary data;
    and the stack bottom structure comprises: the MPLS manage header and the ancillary data.

13. The electronic apparatus according to claim 12, the processor is further configured to:
    analyze the MPLS manage header to determine whether the ancillary data comprises a data type to be processed by a target node; and
    skip to a start position of the data type according to the offset length information when the ancillary data comprises the data type to be processed by the target node, wherein the offset length information is used for indicating data size to be offset from a current position to the start position.

14. The electronic apparatus according to claim 13, wherein the MPLS manage header comprises length information of the ancillary data, or end offset information of the ancillary data, wherein a difference between the end offset information and start offset information of the ancillary data is the length information of the ancillary data.

15. The electronic apparatus according to claim 12, the processor is further configured to:
    read an indicator label corresponding to the stack bottom structure, so as to determine whether the stack bottom structure carries the ancillary data.

16. The electronic apparatus according to claim 14, the processor is further configured to:
    when it is detected that there is a change in the ancillary data, modifying the data type and offset length information of the ancillary data comprised in the MPLS manage header, so as to correspond the modified data type and offset length information to the changed ancillary data.

17. The electronic apparatus according to claim 16, wherein the situation that there is a change in the ancillary data comprises at least one of the following: there is a change in the data size of the ancillary data, the ancillary data is deleted, or new ancillary data is inserted.

18. The electronic apparatus according to claim 12, wherein the MPLS manage header comprises one or more basic units, and each basic unit comprises one or more pieces of ancillary data information.

19. The electronic apparatus according to claim 18, wherein any one of the basic units in the MPLS manage header comprises flag information indicating whether there is any subsequent basic unit.

20. The electronic apparatus according to claim 18, wherein the MPLS manage header comprises number of basic unit information, and the number of basic unit information is used for indicating the number of the basic units in the MPLS manage header, and it is determined that there are subsequent basic units when the number of the basic units that has been analyzed is less than the number of basic unit information.

* * * * *